US012703055B2

(12) United States Patent
Chang

(10) Patent No.: US 12,703,055 B2
(45) Date of Patent: Aug. 11, 2026

(54) METHOD FOR EVALUATING TOOL HEALTH WITH THE TEMPERATURE RISING SIGNAL

(71) Applicant: INDUSTRIAL TECHNOLOGY RESEARCH INSTITUTE, Hsinchu (TW)

(72) Inventor: Hsin-Chang Chang, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 611 days.

(21) Appl. No.: 18/080,859

(22) Filed: Dec. 14, 2022

(65) Prior Publication Data

US 2024/0139897 A1 May 2, 2024

(30) Foreign Application Priority Data

Oct. 31, 2022 (TW) ................................ 111141419

(51) Int. Cl.
*B23Q 17/09* (2006.01)

(52) U.S. Cl.
CPC ..... *B23Q 17/0995* (2013.01); *B23Q 17/0985* (2013.01); *B23Q 17/099* (2013.01)

(58) Field of Classification Search
CPC ...... G05B 19/4065; G05B 2219/37252; G05B 2219/37428; B23Q 17/0985; B23Q 17/099; B23Q 17/0995
See application file for complete search history.

(56) References Cited

U.S. PATENT DOCUMENTS 5,904,457 A * 5/1999 Suwijn ............... G05B 19/4065 409/134
7,168,935 B1 1/2007 Taminger et al.
(Continued)

FOREIGN PATENT DOCUMENTS

CN 103185551 B 7/2015
CN 106346314 A 1/2017
(Continued)

OTHER PUBLICATIONS

Taiwan Patent Office, "Office Action", May 31, 2023, Taiwan.
(Continued)

*Primary Examiner* — Tameem D Siddiquee
(74) *Attorney, Agent, or Firm* — Troutman Pepper Locke LLP; Tim Tingkang Xia, Esq.

(57) ABSTRACT

A method for evaluating tool health with the temperature rising signal, applied to a machine tool that utilizes a tool to perform a removal process upon a workpiece, comprises the steps of: setting a target machining instruction; utilizing a processor to divide the target machining instruction into a residual machining instruction and a micro machining instruction; performing the residual machining instruction; without any coolant or with little coolant, performing the micro machining instruction, and having at least one thermal image sensor to detect a thermal image of a contact area of the tool and the workpiece; having the processor to derive a temperature feature by evaluating the thermal image; and, having the processor to compare the temperature feature with at least one threshold for determining the tool health.

7 Claims, 8 Drawing Sheets

(56) References Cited

U.S. PATENT DOCUMENTS

| | | | | |
|---|---|---|---|---|
| 2008/0213056 | A1* | 9/2008 | Katoh | B23B 41/02 408/59 |
| 2010/0254772 | A1* | 10/2010 | Rozzi | B23B 27/10 407/11 |
| 2017/0374296 | A1* | 12/2017 | Schmidt | G01J 5/10 |
| 2019/0152011 | A1* | 5/2019 | Kummari | G06N 5/04 |
| 2022/0057785 | A1* | 2/2022 | Conning | G06F 21/12 |

FOREIGN PATENT DOCUMENTS

| | | | |
|---|---|---|---|
| CN | 105312965 | B | 5/2017 |
| CN | 104741638 | B | 6/2017 |
| CN | 207402554 | U | 5/2018 |
| CN | 107066775 | B | 3/2020 |
| CN | 111571302 | A | 8/2020 |
| TW | I226590 | B | 1/2005 |
| TW | I447388 | B | 8/2014 |
| TW | I649551 | B | 2/2019 |
| TW | I733577 | B | 7/2021 |
| TW | 202221644 | A | 6/2022 |

OTHER PUBLICATIONS

Herchang Ay et al., Heat transfer and life of metal cutting tools in turning, International Journal of Heat and Mass Transfer, vol. 41, Issue 3, 1998, pp. 613-623.

Ning Ding et al., Research on Tool Wear State Based on Cutting Temperature Analysis, Light Industry Machinery, 2019, vol. 37, No. 5.

* cited by examiner

METHOD FOR EVALUATING TOOL HEALTH WITH THE TEMPERATURE RISING SIGNAL

CROSS REFERENCE TO RELATED APPLICATION

This application claims the benefits of Taiwan application Serial No. 111141419, filed on Oct. 31, 2022, the disclosures of which are incorporated by references herein in its entirety.

TECHNICAL FIELD

The present disclosure relates in general to a process technology, and more particularly to a method for evaluating tool health with the temperature rising signal that can determine the tool health by evaluating the temperature rising of the tool.

BACKGROUND

Regarding removal processing, such as turning, milling and grinding, the tool must be replaced at an appropriate time to maintain good processing quality. Generally, methods for judging the tool health include at least the following.

For example, based on the time of use or the number of use, tools are usually replaced according to individual experience. However, in order to avoid unexpected workpiece damage or machine downtime caused by accidental tool breakage or damage, it is often necessary to change the tool in advance; i.e., by shortening the time of use or reducing the number of use. Namely, the service life of the tool would be forced to be shortened, from which an increase in the number of tool changes would be unavoidable to lead to an increase in tool cost but a decrease in utilization rate.

In another example, a high-resolution camera is introduced to capture the image of the tool tip to judge the degree of deterioration. In online image capturing and processing, some technical problems such as brightness, shadows and precise tool tip positions shall be overcome, and as a result the accuracy and applications would be limited. On the other hand, in offline detection, the tool needs to be moved away to a health evaluation device, which would definitely increase the labor hours required for evaluation.

In a further example, processing information such as loads or torques would be imported and further analysis to calculate auxiliary information for a determination of tool change. However, a large difference between rough and finish machining exists in the load value of the machining tool, from which practical applications would be limited. In addition, since long-term data collection and application scenarios will somehow affect the accuracy of assessment, thus willingness to introduce the technology would be reduced.

Accordingly, this disclosure breaks through traditional thinking to develop a "method for evaluating tool health with the temperature rising signal" that can evaluate tool's thermal temperature rise to judge the tool health and further to determine a better time for tool replacement, to meet an urgent need in the art. As such, the related evaluation would present higher accuracy, possibility in worse tool-replacement timing, late or early, leading to workpiece damage or machine shutdown would be avoided, and thus better processing quality can be maintained, and provide methods for those in the relevant technical fields to solve problems urgently.

SUMMARY

In one embodiment of this disclosure, a method for evaluating tool health with the temperature rising signal, applied to a machine tool that utilizes a tool to perform a removal process upon a workpiece, comprising the steps of:

- setting a target machining instruction;
- utilizing a processor to divide the target machining instruction into a residual machining instruction and a micro machining instruction;
- performing the residual machining instruction;
- without any coolant or with little coolant, performing the micro machining instruction, and having at least one thermal image sensor to detect a thermal image of a contact area of the tool and the workpiece;
- having the processor to derive a temperature feature by evaluating the thermal image; and
- having the processor to compare the temperature feature with at least one threshold for determining the tool health.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
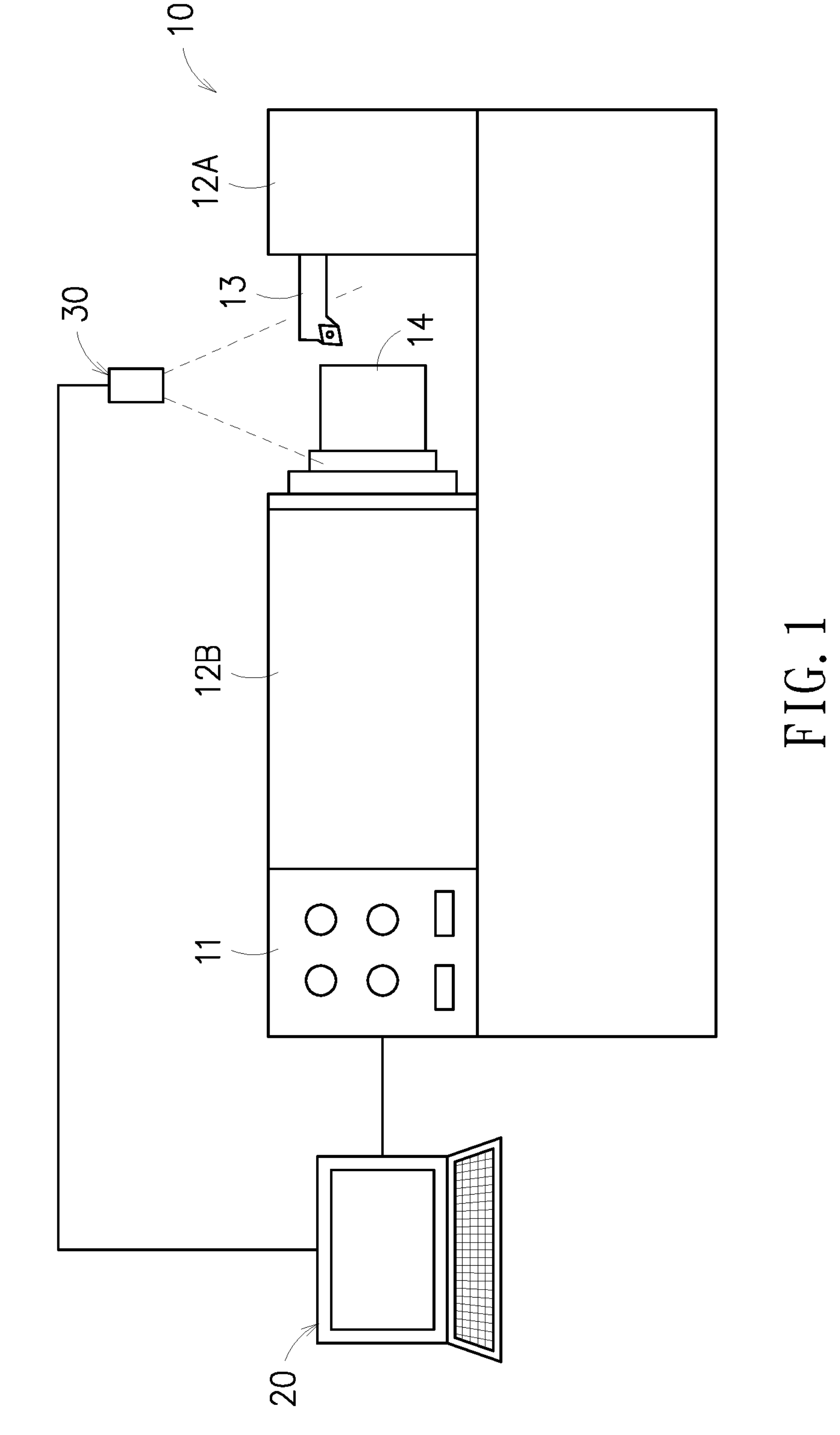
FIG. 1 is a schematic view showing an example of a system to perform the method provided in this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring to FIG. 1, a system 100 for carrying out the method for evaluating tool health with the temperature rising signal in accordance with this disclosure is schematically shown. This system 100, applied to a machine tool 10, includes a processor 20 and a thermal image sensor 30.

The machine tool 10 includes a controller 11, two drives 12A, 12B individually connected with the controller 11, a tool 13 connected with and driven by the drive 12A, and a workpiece 14 loaded to the drive 12B to perform motions such as displacements or rotations. The removal processing of this disclosure is performed upon the workpiece 14 by the tool 13.

The form of the machine tool 10 is not limited in this disclosure. The machine tool 10 of this disclosure is any machine tool that can send a workpiece to contact a tool and use the tool to perform removal processing on the workpiece. For example, the machine tool 10 of this disclosure can be a lathe, a milling machine, a drilling machine, a grinding machine, a boring machine, a planer, a punching machine or a composite processing equipment with the above-mentioned multiple functions for performing the material removal processing such as turning, milling, drilling, grinding, boring, planing, stamping, or composite processing integrating the above-mentioned multiple functions on the workpiece 14.

The form of the controller 11 is also not limited in this disclosure. For example, the controller 11 of this disclosure can be a CNC (computer numerical control) controller with a human-machine interface with a screen and a keyboard, software, and a control program.

The drive 12 of this disclosure can be an electronic or mechanical drive such as a motor, a gear, a screw bar, a hydraulic or pneumatic device, etc.

According to different machine tools 10, the tool 13 can be a turning tool (lathe cutter), a milling cutter, a drill, a grinding wheel, a boring tool, a planer, a punch, or any other tool for removable processing, but is not limited thereto.

According to practical requirements, the workpiece 14 of this disclosure can be formed as a block, a columnar, a sheet or any geometric shape, and the material of the workpiece 14 thereof can be metal or wood.

The controller 11 of this disclosure is connected with a processor 20 that can perform the program or software of the method for evaluating tool health with the temperature rising signal.

The processor 20 of this disclosure can be integrated into the controller 11 of the machine tool 10, or independent thereto; such as a computer with a relevant human-machine interface shown in FIG. 1, but not limited thereto.

Figure 2:
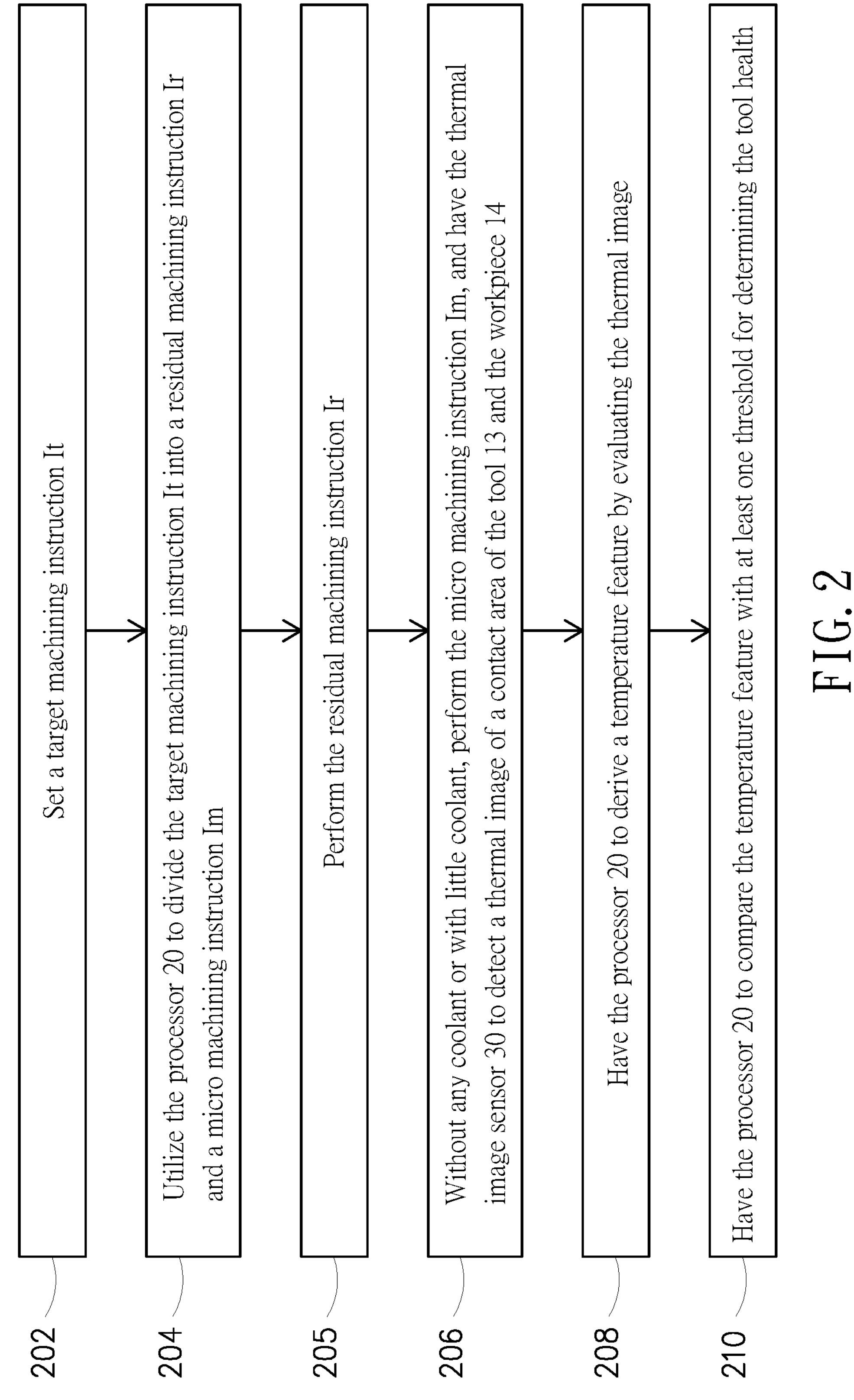
FIG. 2 is a schematic flowchart of an embodiment of the method in accordance with this disclosure.

Referring to FIG. 1 and FIG. 2, the method for evaluating tool health with the temperature rising signal 200 of this disclosure is a program executed by the processor 20 of the system 100, and applied to the machine tool 10 of FIG. 1 that uses the tool 13 to perform the removal processing upon the workpiece 14.

In Step 202, set a target machining instruction It. Select or add a machining instruction from or into NC (Numerical control) programs the instant machine tool as a target machining instruction It for processing a target machining depth Dt (i.e., a total depth needed to be machined). As shown in FIG. 1, in the case that the machine tool 10 is a lathe, the controller 11 is used to set the target machining instruction to determine the depth of the workpiece 14 needed to be machined by the tool 13.

Then, referring to FIG. 1 and FIG. 2, in Step 204, the target machining instruction is divided into a residual machining instruction Ir and a micro machining instruction Im by the processor. The residual machining instruction Ir is used to perform a residual machining depth Dr, and the micro machining instruction Im is used to perform a micro machining depth Dm.

The micro machining depth Dm is equal to or greater than the minimum unit displacement of the tool 13, up to different requirements. For example, if the minimum unit displacement for the controller 11 to control the tool 13 is 1 μm, then the micro machining depth Dm can be set to 1 μm or N×1 μm, where N is an integer.

A relationship among the target machining depth Dt, the residual machining depth Dr and the micro machining depth Dm is:

$$Dt=Dr+Dm$$

For example, if the target machining depth Dt is 10 μm, and the residual machining depth Dr is 9 μm, then the micro machining depth Dm is 1 μm. If the target machining depth Dt is 1 μm, and the residual machining depth Dr is 0 μm, then the micro machining depth Dm is 1 μm.

Figure 3:
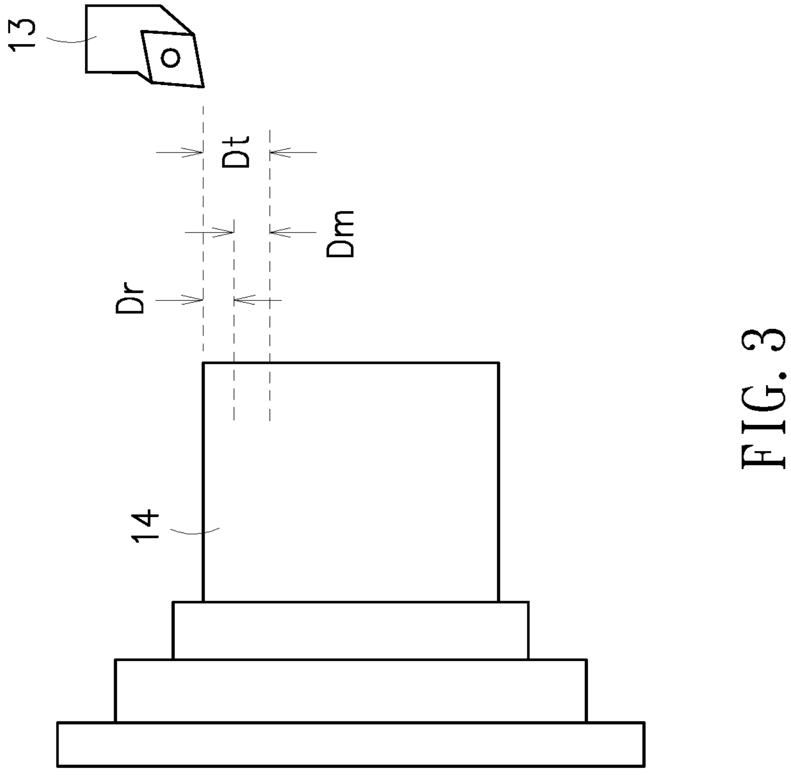
FIG. 3 illustrates schematically three cutting parameters of the method in the example of FIG. 1.

Referring to FIG. 2 and FIG. 3, by having the lathe machining as an example, in Step 202, the set target machining instruction It can drive the tool 13 to perform a target machining depth Dt upon the workpiece 14. In Step 204, the target machining instruction It is divided into a residual machining instruction Ir and a micro machining instruction Im. The residual machining instruction Ir can drive the tool 13 to perform a residual machining depth Dr upon the workpiece 14. The micro machining instruction Im can drive the tool 13 to perform a micro machining depth Dm upon the workpiece 14.

In Step 205, the residual machining instruction Ir is performed. The machining process is firstly to perform the residual machining instruction Ir to machine the residual machining depth Dr, and then the micro machining instruction Im to machine the micro machining depth Dm. The total machining depth is equal to the target machining depth Dt. If the residual machining depth Dr of the residual machining instruction Ir is less than or equal to 0, it implies that performing the residual machining instruction Ir is not necessary.

Then, referring to FIG. 1 and FIG. 2, in Step 206, without any coolant or with little coolant, the micro machining instruction Im is performed, and the thermal image sensor 30 detects a thermal image of a contact area of the tool 13 and the workpiece 14. It shall be explained that, during the machining process, related added liquids include cutting fluids, coolants and grinding fluids to provide cooling, chip removal, friction and other functions. The aforesaid fluids can be collectively referred to as the coolants.

It shall be explained that a purpose of "without any coolant or with little coolant" is to avoid possible interference in detecting the thermal image. In addition, while in performing the micro machining instruction Im, due to less machining depth and less material removal, thus the associate temperature rise is small. Even in a situation without any coolant or with little coolant, the tool 13 won't face a risk of rapid wearing. Thus, the detection of the thermal image in this disclosure is selectively performed while in the micro processing.

As described above, setting of the micro machining depth Dm is dependent on the minimum unit displacement of the tool 13 controlled by the controller 11. In addition, the setting of the micro machining depth Dm is also related to materials of the tool 13 and the workpiece 14. For example, if the workpiece 14 is made of Aluminum, then, when the machining depth is 5 μm, the maximum temperature-feature rise value would be about 50° C.

If the workpiece 14 is made of Titanium, then, due to its hardness, the maximum temperature-feature rise value would be about 200° C. for a machining depth of 5 μm. Namely, while in setting the micro machining depth Dm, the material of the workpiece 14 shall be considered as well.

Figure 5:
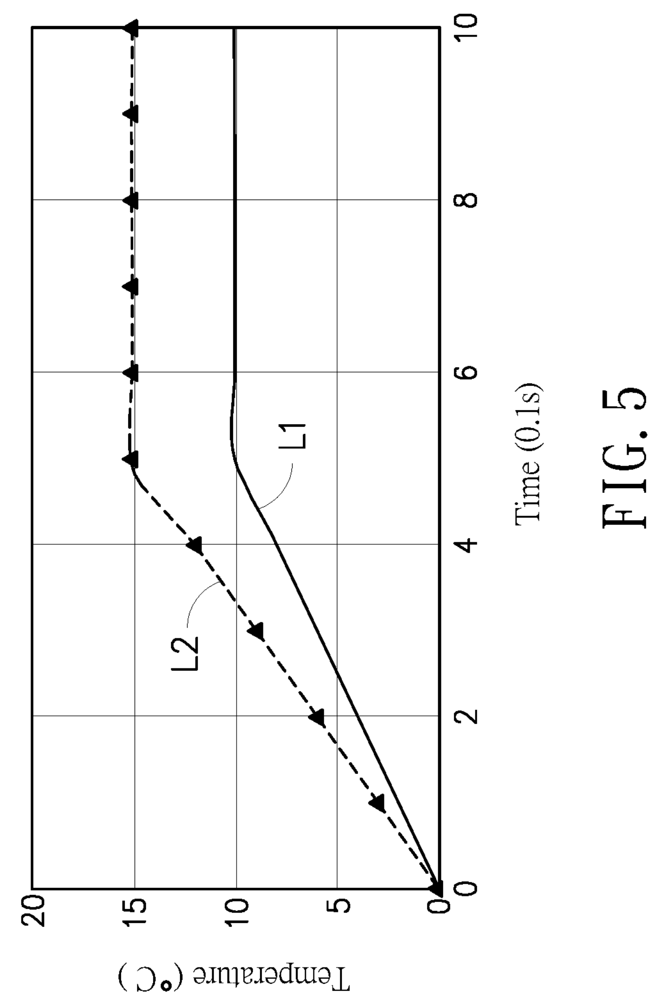
FIG. 5 shows schematically a temperature rise trajectory of the contact point of FIG. 4.
Figure 4:
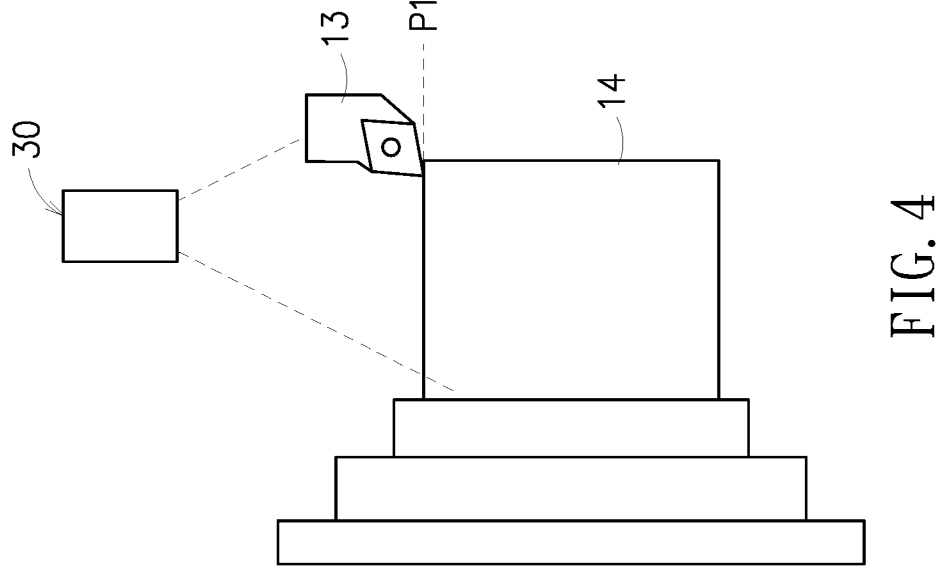
FIG. 4 shows schematically a turning machining of FIG. 1.

Referring to FIG. 4 and FIG. 5, how the thermal image sensor 30 is used to detect the thermal image of the contact area of the tool 13 and the workpiece 14 in Step 206 is elucidated. FIG. 4 demonstrates schematically that the tool 13 contacts the workpiece 14. In this embodiment, since the tool 13 is a lathe cutter, thus the contact between the tool 13 and the workpiece 14 during the machining would be a point contact; i.e., the contact area is a point. Along with the machining, the temperature at a contact point P1 would rise gradually, and then reach a maximum temperature in a steady state. The thermal image sensor 30 is applied to detect the temperature rise variation at the contact point P1, and the processor 20 (referred to FIG. 1) would record the temperature rise variation at the contact point P1.

FIG. 5 illustrates schematically two temperature rise trajectories (temperature rise vs time) at the sampling rate of 0.1 seconds. In FIG. 5, the temperature rise trajectory L1 stands for a tool 13 with good health. With the increase of the machining time, the temperature rise at the contact point P1 of the tool 13 and the workpiece 14 would vary from 0° C. to a stable 10° C. On the other hand, the temperature rise trajectory L2 stands for another tool 13 with ill health. With the increase of the machining time, the temperature rise at the contact point P1 of the tool 13 and the workpiece 14 would vary from 0° C. to a stable 15° C.

Namely, at the same machining timing, the temperature rise at the machining point (i.e., the contact point) for a tool at an ill health would be higher than that for another tool with good health. Thus, as an exemplary example, the temperature rise trajectory L2 can be referred as a threshold trajectory for judging the health of the tool 13.

Then, referring back to FIG. 1 and FIG. 2, in Step 208, the processor 20 would evaluate the captured thermal images to analyze the temperature feature.

In the example shown in FIG. 4 and FIG. 5, along with the increase of the machining time, the temperature (also, the temperature rise) at the contact point of the tool and the workpiece would rise gradually, and then reach a stable high. Theoretically, such a temperature feature (TF) includes a temperature-feature rise velocity (TFV) and the maximum temperature-feature rise value (TFM).

It is noted that the tool 13 in FIG. 4 is a lathe cutter. While in a lathe machining, the contact point of the tool 13 and the workpiece 14 is ideally presented as a point contact, and thus each of the contact points P1 (if any) shall have a temperature feature. The processor 20 can evaluate the thermal images obtained in Step 206 to obtain a corresponding temperature rise trajectory like any of two shown in FIG. 5. Thereupon, the temperature feature (TF) for each contact point P1, including the TFV and the TFM, can be obtained.

Then, referring back to FIG. 1 and FIG. 2, in Step 210, the processor 20 would compare the obtained TF(s) with at least one threshold trajectory for evaluating the health of the tool 13.

As described above, since the TF includes the TFV and the TFM, thus the threshold values featured the threshold trajectory can include a temperature-feature rise velocity (TFV) threshold and a maximum temperature-feature rise value (TFM) threshold. By comparing the TFV to the TFV threshold and the TFM to the TFM threshold, the health of the tool 13 can be determined.

Figure 6:
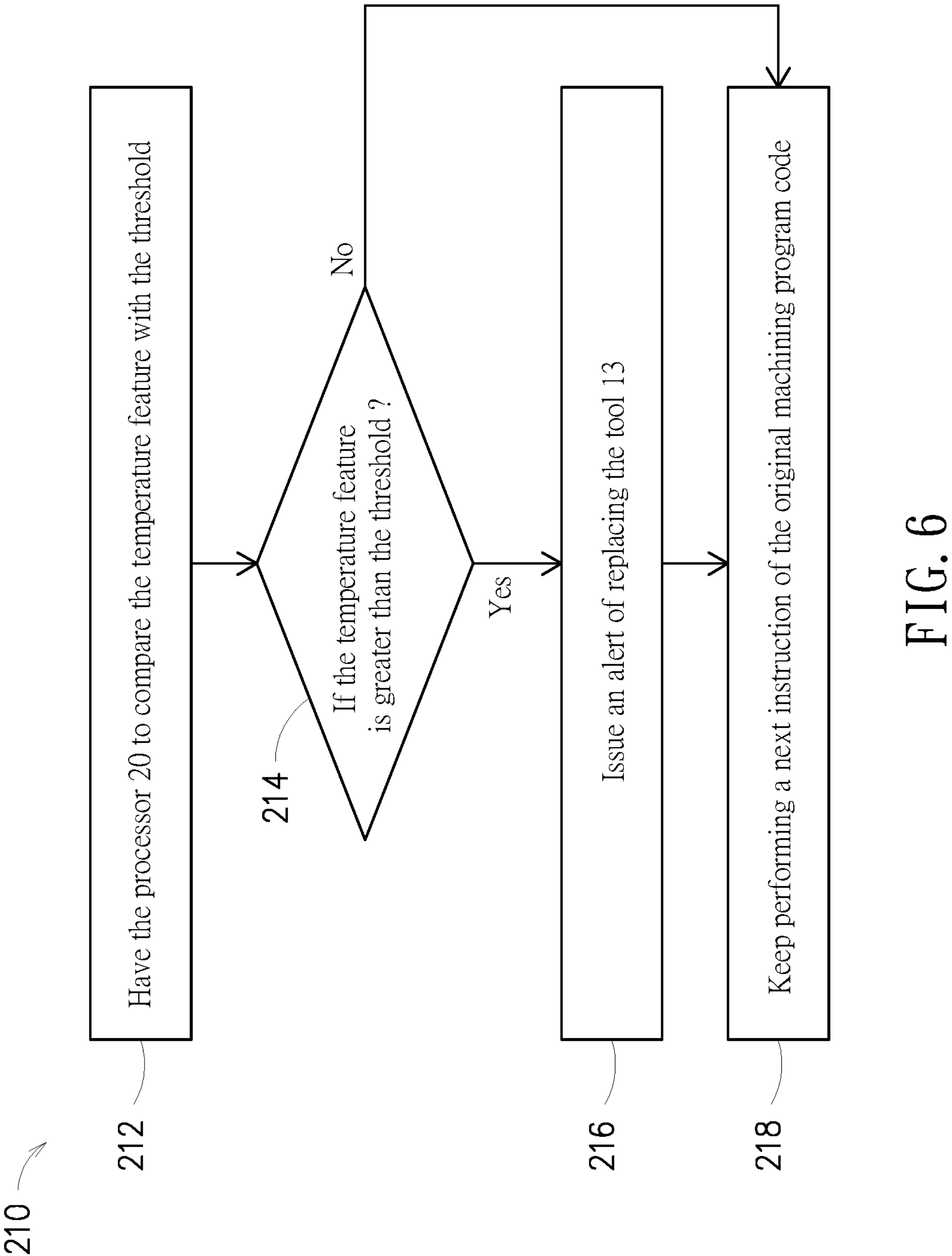
FIG. 6 is a schematic flowchart of a method to perform the health evaluation in accordance with this disclosure.

Referring to FIG. 6, detail steps for evaluating the health of the tool are listed to include the following steps.

Step 212: The processor 20 compares the temperature feature and the respective threshold value.

Step 214: Determine whether or not the temperature feature is greater than the corresponding threshold value. If positive, go to perform Step 216 and Step 218, then an alert of replacing the tool 13 is issued, and a next instruction in the original machining program code is continuously performed. If negative, go to perform Step 218, and thus the next instruction in the original machining program code is continuously performed.

In this embodiment, when the alert of replacing the tool 13 is received, the tool 13 can still keep its cutting, and the determination of replacing the tool 13 or not would be re-evaluated while another threshold standing for a worse health of the tool 13 is hit. Alternatively, the tool 13 can be replaced immediately right after this alert arrives.

For the setting of the threshold(s), it can be done while in machining or in default prior to the machining. Generally, the thresholds are the same for the same tool upon the same type of the workpiece. In addition, the threshold(s) can be preset, and no more setting of the threshold(s) may be required if the threshold(s) are already existed.

Figure 6A:
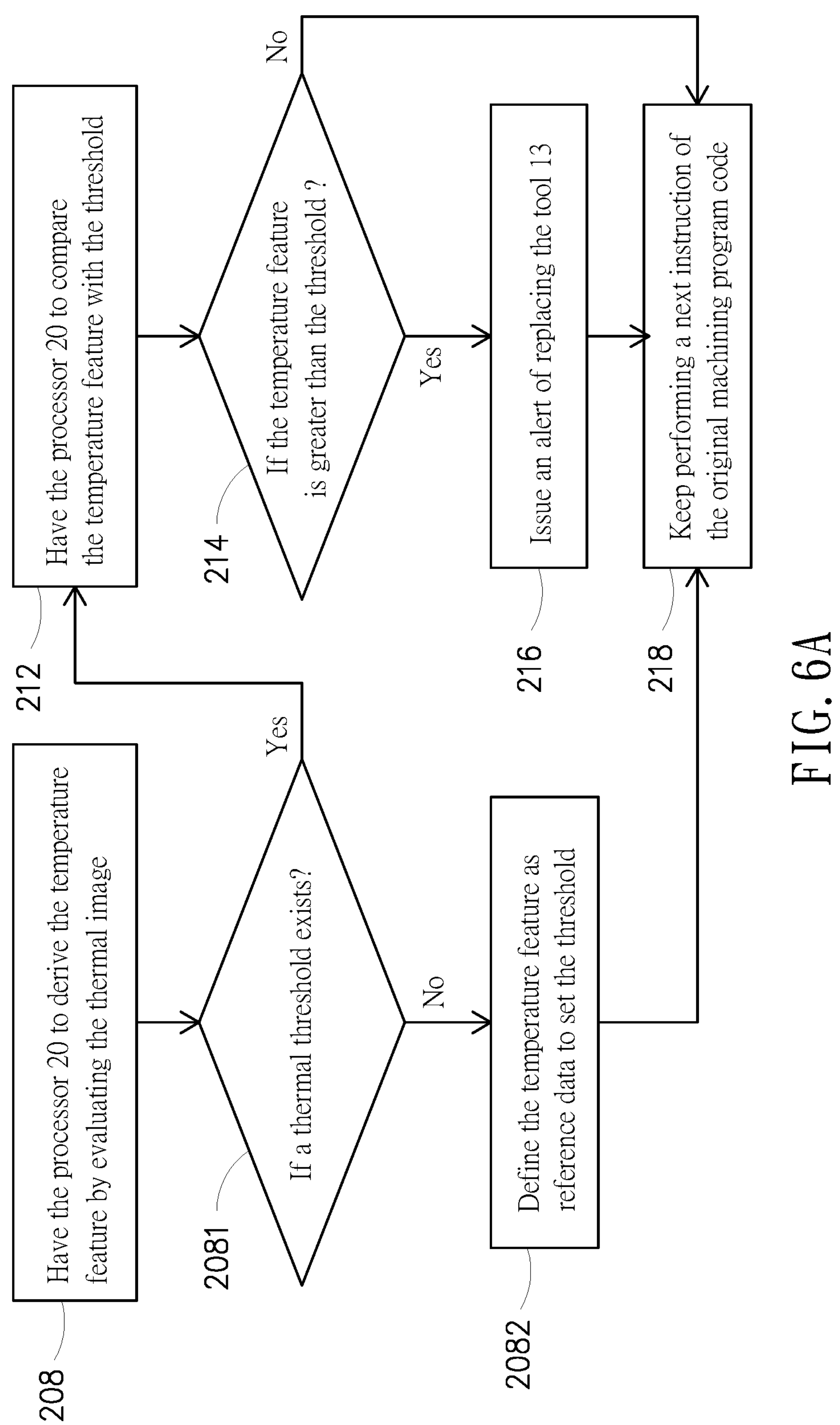
FIG. 6A is a schematic flowchart of another method to perform the health evaluation in accordance with this disclosure.

Referring to FIG. 6A, Steps to be performed while the threshold is already existent are schematically shown. After Step 208 of FIG. 2, Step 2081 is performed to determine whether or not a threshold is existed. If positive, go to perform Steps 212, 214, 216 and 218 of FIG. 6. If negative, go to perform Step 2082 of having the instant temperature feature as the reference for proceeding the setting of the threshold(s), and then perform Step 218 and the following Steps.

In addition, in this embodiment, a plurality of thresholds can be included. The processor would compare the temperature features individually with different thresholds, and different tool-replacing alerts corresponding to different sections of the contact area of the tool and the workpiece would be issued accordingly. Such a design is resembled functionally to the alert clock. Regarding setting of the sections, details thereabout would be elucidated as follows.

In addition, more than one thermal image sensor 30 can be included in this disclosure. According to practical needs, the plural thermal image sensors 30 can be separately disposed to capture the thermal image at different angles, such that the accuracy of the health evaluation can be further enhanced.

In the aforesaid embodiment, the tool 13 is embodied as a lathe cutter. However, in some other embodiments, the method of this disclosure can be applicable to any machine tool that can perform the material removal processing.

Figure 8:
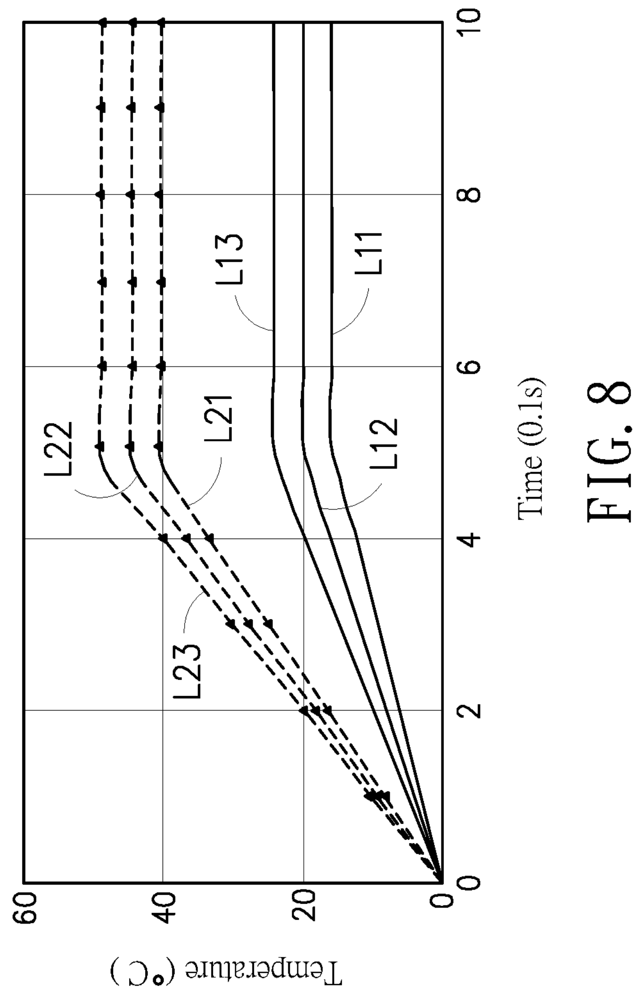
FIG. 8 shows schematically a temperature rise trajectory of the contact point of FIG. 7.
Figure 7:
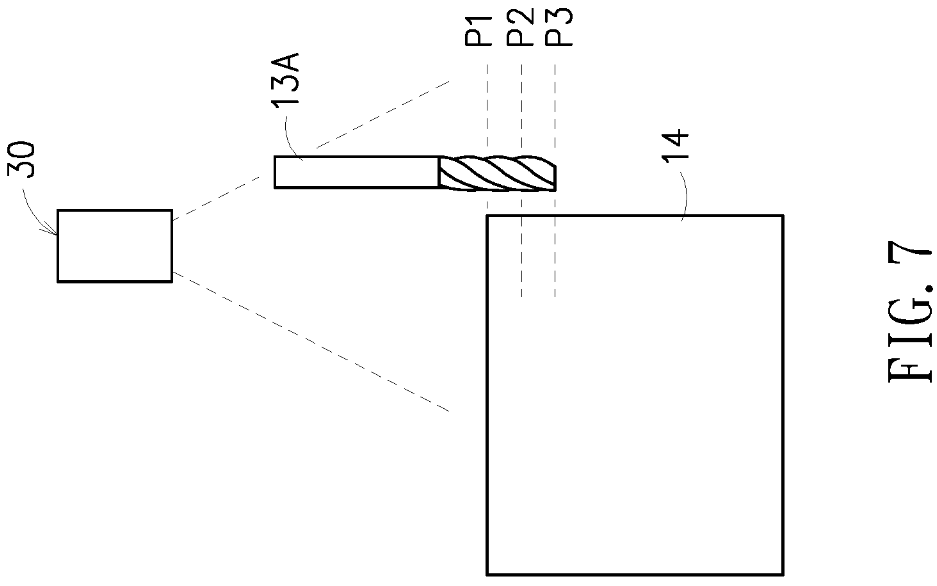
FIG. 7 shows schematically a milling machining of FIG. 1.

Refer now to FIG. 7 and FIG. 8. The tool 13A in FIG. 7 is a milling cutter to perform milling upon the workpiece 14, and thus the contact area of the tool 13A and the workpiece 14 would be a line with a specific length. In order to make the detection of the thermal image sensor 30 more accurate, the line-type contact area can be divided into three sections for detecting contact points P1, P2, P3, respectively. Similarly, along with the increase of the processing time, temperatures at contact points P1, P2, P3 would rise gradually, and then reach respective stable maximum temperatures. The thermal image sensor 30 is used to separately detect the corresponding temperature rise variations with respect to contact points P1, P2, P3, and the processor 20 (referred to FIG. 1) can be used to establish the corresponding temperature rise trajectories of contact points P1, P2, P3, respectively.

FIG. 8 shows schematically two groups of the temperature rise trajectories (time vs temperature rise), with the same sampling time of 0.1 seconds. As shown, temperature rise trajectories L11, L12, L13 stand for the group of good-health tools 13A, while temperature rise trajectories L21, L22, L23 stand for the group of ill-health tools 13A. During the milling, since the tool 13A is fed in a direction perpendicular to an axial direction of the tool 13A, thus contact points P1, P2, P3 contact the workpiece 14 simultaneously, and hence three temperature rise trajectories are included in each of the two groups of the temperature rise trajectories.

In this embodiment, each of the three contact points P1, P2, P3 would have a temperature feature. The processor 20 would evaluate the thermal images obtained in Step 206 to derive the temperature features of the contact points P1, P2, P3, respectively, and then, in Step 208, each of the temperature features would be compared with at least one threshold so as to access the health of the tool 13A.

It shall be explained that, in the embodiment of FIG. 7, since the tool 13A contacts the workpiece 14 by the cutting edge thereof, three contact points P1, P2, P3 form three corresponding temperature features simultaneously. On the other hand, if the tool 13A has its cutting tip to contact the workpiece 14, then it implies that the only a contact point can be generated, and so the resulted temperature rise trajectories would be similar to those shown in FIG. 5.

Figure 10:
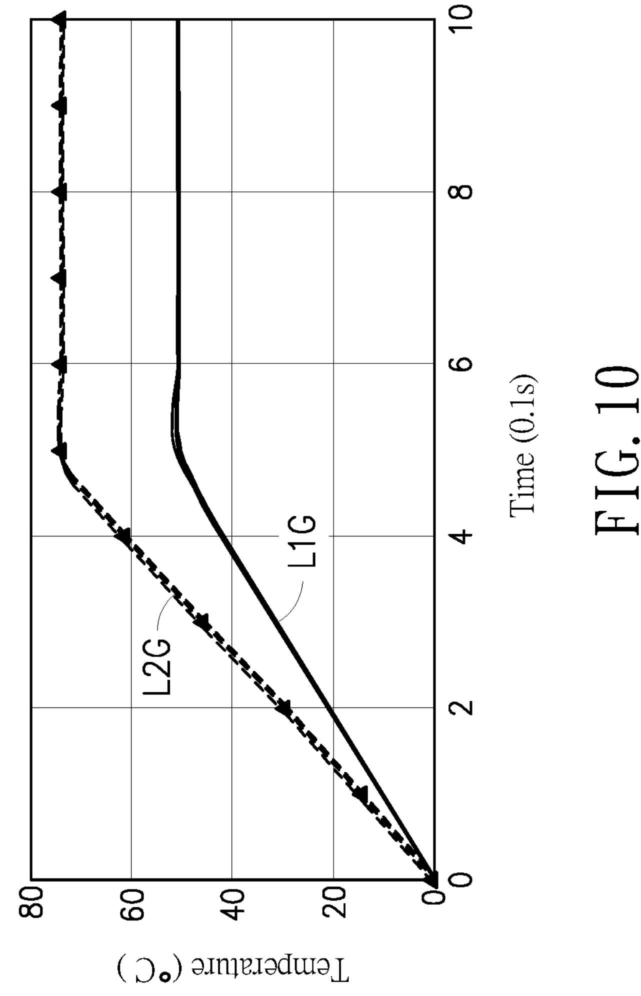
FIG. 10 shows schematically a temperature rise trajectory of the contact point of FIG. 9.
Figure 9:
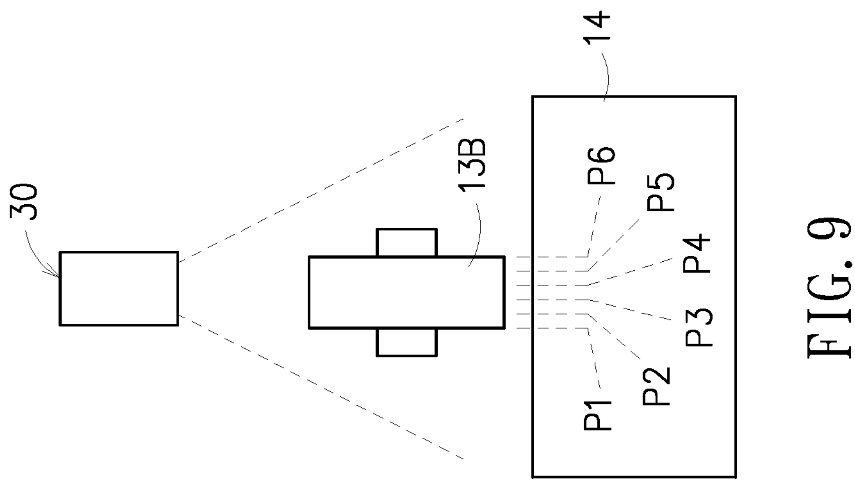
FIG. 9 shows schematically a grinding machining of FIG. 1.

Refer now to FIG. 9 and FIG. 10. The tool 13B in FIG. 9 is a grinding wheel to perform grinding upon the workpiece 14, and thus the contact area of the tool 13B and the workpiece 14 would be a line with a specific length. In order to make the detection of the thermal image sensor 30 more accurate, the line-type contact area can be divided into six sections for detecting contact points P1~P6, respectively. Similarly, along with the increase of the processing time, temperatures at contact points P1~P6 would rise gradually, and then reach respective stable maximum temperatures. The thermal image sensor 30 is used to separately detect the corresponding temperature rise variations with respect to contact points P1~P6, and the processor 20 (referred to FIG. 1) can be used to establish the corresponding temperature rise trajectories of contact points P1~P6, respectively. FIG. 10 shows schematically two groups of the temperature rise trajectories (time vs temperature rise), with the same sampling time of 0.1 seconds. As shown, temperature rise trajectories L1G stand for the group of good-health tools 13B, while temperature rise trajectories L2G stand for the group of ill-health tools 13B. In each group of the temperature rise trajectories L1G, L2G, six temperature rise trajectories for six corresponding contact points P1~P6 are included. During the grinding, since the tool 13B contacts the workpiece 14 by the surface abrasive grains thereof, thus the six temperature rise trajectories in the same group would be almost overlapped in FIG. 10. However, it shall be noted anyway that each group LIG or L2G of the temperature rise trajectories shown in FIG. 10 are consisted of six temperature rise trajectories.

In this embodiment, each of the six contact points P1~P6 would have a temperature feature. The processor 20 would evaluate the thermal images obtained in Step 206 to derive the temperature features of the contact points P1~P6, respectively, and then, in Step 208, each of the temperature features would be compared with at least one threshold so as to access the health of the tool 13B.

In the aforesaid description, three embodiments (FIG. 4 and FIG. 5, FIG. 7 and FIG. 8, and FIG. 9 and FIG. 10) are raised to elucidate that the method for evaluating tool health with the temperature rising signal provided in this disclosure is applicable to any machine tool capable of material removal processing.

In the testing with or without the involvement of the coolants (machining fluids), if the machining depth is 1 μm, then the maximum temperature-feature rise value would be about 10° C., and 0.5 seconds at most are required to reach the maximum temperature-feature rise value. Since the machining is performed by the tool having a maximum 80° C. at a tip thereof, and the 80° C. at the tool is still way far from the melting temperature of the tool material, thus no additional wearing shall be concerned, and no additional spark during machining would be generated. All these verify the applicability of this disclosure.

In the embodiment shown in FIG. 7 and FIG. 8, or that shown in FIG. 9 and FIG. 10, the contact area is divided into sections so as to enable sectional detection of the thermal images. When the width of the contact area (contact width) of the tool and the workpiece varies, while in detecting the thermal image, it shall be noted that the determination of the section number (i.e., the number of the detection points) can be made according to the resolution (i.e., the pixels) of the thermal image sensor and the contact width of the tool and the workpiece. In addition, the thermal image sensor and the detection position are also related in distance. In the case that the thermal image sensor is close to the contact area of machining, the contact width would occupy more pixels. If the thermal image sensor is far from the contact area of machining, the contact width would occupy less pixels. Namely, when the thermal image sensor is close to the contact area of machining, then the embodiment of FIG. 9 and FIG. 10 may be provided with more than five sections. When the thermal image sensor is far from the contact area of machining, then two to four sections (less than five) may be enough. In addition, when the pixels of the sensor is higher, then the division can be finer to provide more detection points. Anyhow, this disclosure is featured to utilize the thermal image sensor to detect the thermal image of the contact area of the tool and the workpiece.

In summary, the method for evaluating tool health with the temperature rising signal provided in this disclosure is technically featured in utilizing the thermal image sensor to detect the temperature rise, following the instructions to divide and organize micro machining process, and detecting the temperature-feature rise velocity and the maximum temperature-feature rise value for further judgement during the detection of the micro machining process. In this disclosure, the temperature-rise detection in the micro machining process is characterized on that: the detection of the thermal image sensor won't be affected by possible involvement of the coolants, no spark would be generated to interference the detection of the thermal image sensor, and the low temperature at the cutter tip won't lead to additional wear at the tool. Thereupon, the health assessment of the tool and the determination of the timing to replace the tool can be accurately provided.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A method for evaluating tool health with the temperature rising signal, executed by a processor that applied to a machine tool to utilize a tool to perform a removal process upon a workpiece, comprising the steps of:

setting a target machining instruction, wherein the target machining instruction is used to perform a target machining depth Dt;

utilizing the processor to divide the target machining instruction into a residual machining instruction and a micro machining instruction, wherein the residual machining instruction is used to perform a residual machining depth Dr, the micro machining instruction is used to perform a micro machining depth Dm, the micro machining depth Dm is equal to or greater than a minimum unit displacement of the tool, and Dt=Dr+Dm;

performing the residual machining instruction;

with or without any coolant, performing the micro machining instruction, and having at least one thermal image sensor to detect a thermal image of a contact area of the tool and the workpiece;

having the processor to derive a temperature feature by evaluating the thermal image; and having the processor to compare the temperature feature with at least one threshold for determining the tool health;

wherein the thermal image sensor divides the contact area of the tool and workpiece into sections, and the thermal image is detected at each of the sections.

2. The method for evaluating tool health with the temperature rising signal of claim 1, wherein, after the processor evaluates the thermal image to derive the temperature feature, a determination whether or not the threshold exists is firstly made; if positive, have the processor to compare the temperature feature to the at least one threshold for determining the tool health; and, if negative, the temperature feature is referred to set the threshold, and then perform a next instruction of an original machining program code.

3. The method for evaluating tool health with the temperature rising signal of claim 1, wherein the processor compares the temperature feature with the at least one threshold, and determines whether or not the temperature feature is greater than the threshold; if positive, issue an alert to replace the tool, and keep performing a next instruction of an original machining program code; and, if negative, keep performing the next instruction of the original machining program code.

4. The method for evaluating tool health with the temperature rising signal of claim 3, further including a plurality of different thresholds, wherein the processor compares the temperature feature with each of the plurality of different thresholds, and issues different alerts of replacing the tool at different sections of the contact area of the tool and the workpiece.

5. The method for evaluating tool health with the temperature rising signal of claim 1, wherein the temperature feature includes a temperature-feature rise velocity and a maximum temperature-feature rise value, the threshold includes a temperature-feature rise velocity threshold and a maximum temperature-feature rise value threshold, the temperature-feature rise velocity is compared with the temperature-feature rise velocity threshold, the maximum temperature-feature rise value is compared with the maximum temperature-feature rise value threshold, and thus the tool health is determined.

6. The method for evaluating tool health with the temperature rising signal of claim 1, wherein the machine tool includes a controller, the controller is connected with at least one drive, the at least one drive is connected with the tool to drive the tool, and the controller is connected with the processor.

7. The method for evaluating tool health with the temperature rising signal of claim 6, wherein the processor is integrated in or independent to the controller of the machine tool.

* * * * *